E. H. WAUGH & W. J. SWARTZ.
PREPARING APPARATUS FOR CONFECTIONERY.
APPLICATION FILED MAR. 13, 1914.

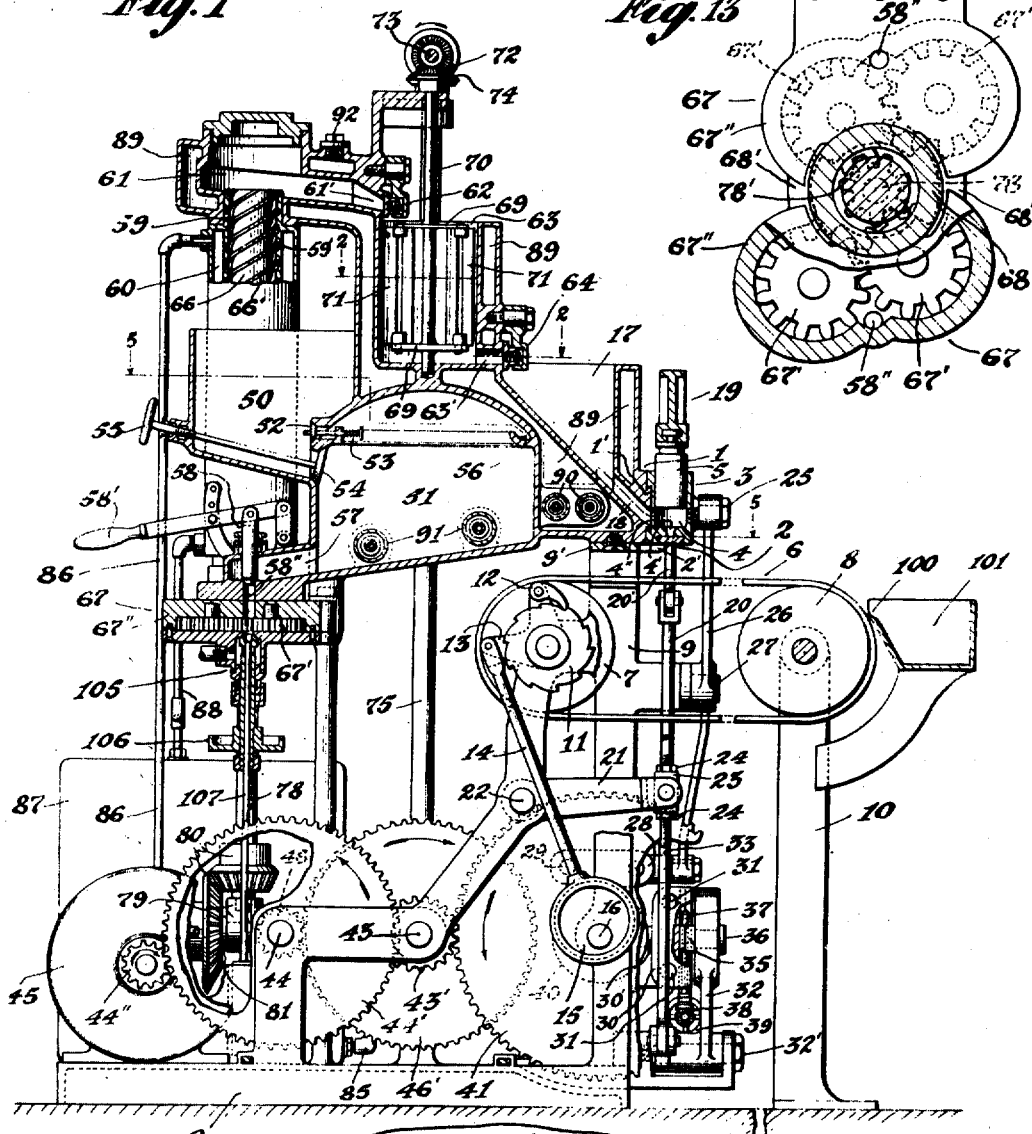

1,227,714.

Patented May 29, 1917.
4 SHEETS—SHEET 2.

WITNESSES:

INVENTORS
Edward H. Waugh
William J. Swartz
BY
Adams & Brooks
ATTORNEYS.

E. H. WAUGH & W. J. SWARTZ.
PREPARING APPARATUS FOR CONFECTIONERY.
APPLICATION FILED MAR. 13, 1914.
1,227,714.
Patented May 29, 1917.
4 SHEETS—SHEET 3.
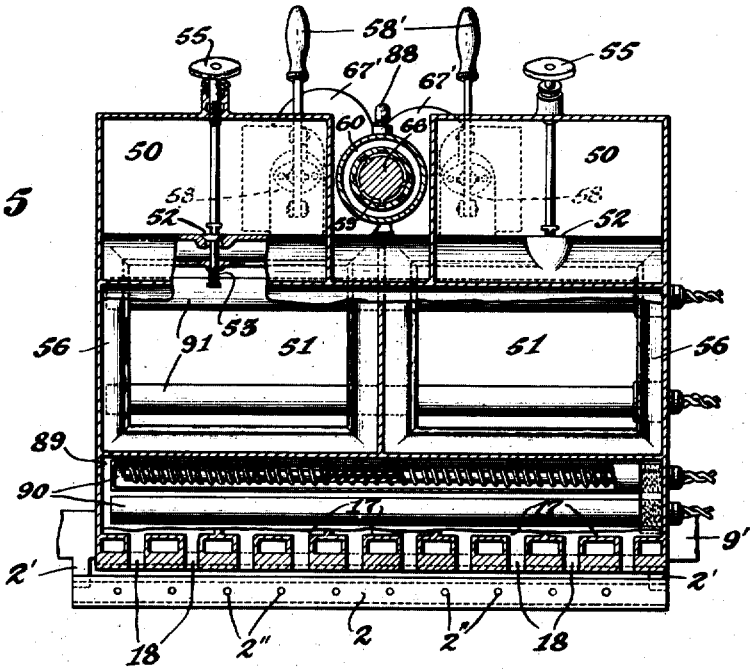
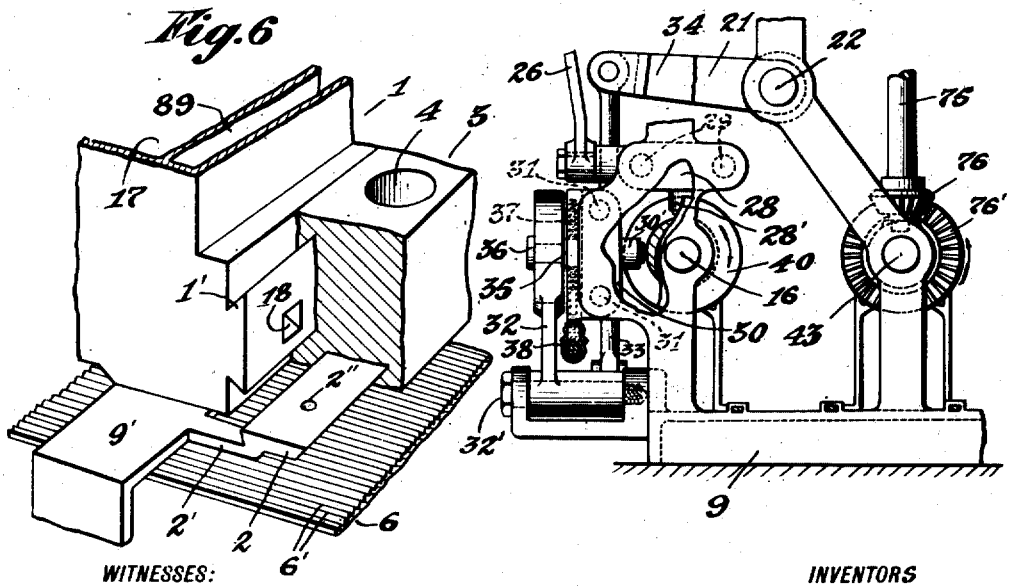
WITNESSES:
James E. Sproll.
Stewart L. Simpson.
INVENTORS
Edward H. Waugh.
William J. Swartz.
BY
Adams & Brooks
ATTORNEYS.

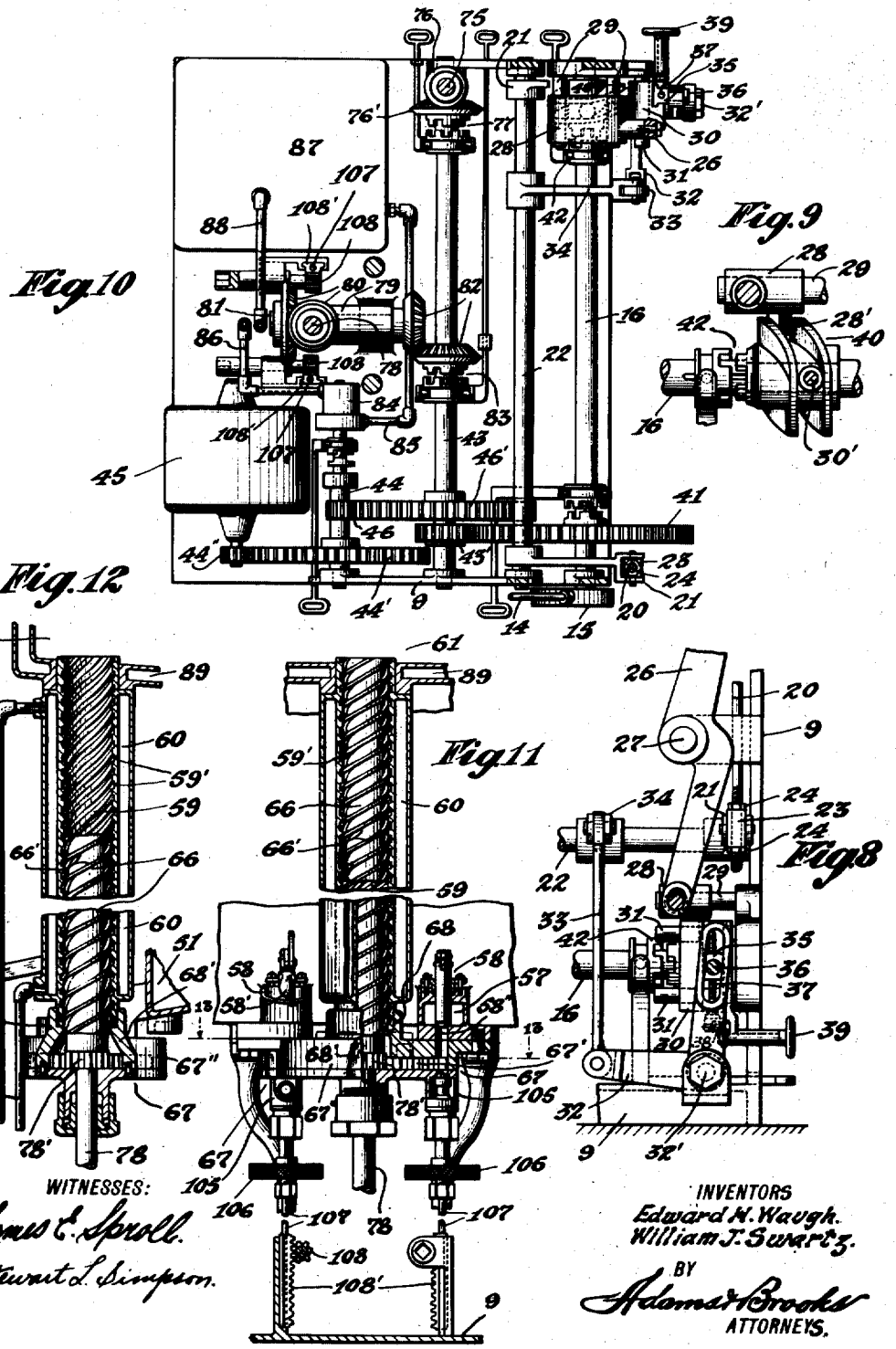

UNITED STATES PATENT OFFICE.

EDWARD H. WAUGH AND WILLIAM J. SWARTZ, OF SEATTLE, WASHINGTON, ASSIGNORS TO AUTOMATIC CANDY MACHINE COMPANY, A CORPORATION OF WASHINGTON.

PREPARING APPARATUS FOR CONFECTIONERY.

1,227,714.      Specification of Letters Patent.      Patented May 29, 1917.

Application filed March 13, 1914. Serial No. 824,479.

*To all whom it may concern:*

Be it known that we, EDWARD H. WAUGH and WILLIAM J. SWARTZ, citizens of the United States, residing at Seattle, in the county of King and State of Washington, have invented certain new and useful Improvements in Preparing Apparatus for Confectionery, of which the following is a specification.

Our invention has more particular reference to apparatus designed for the preparation of candy mixtures and has for one of its objects to provide a novel mechanism wherein the raw material or materials are reduced by heat to a semi-liquid or molten condition.

The invention has for a further object to provide improved mixing and reducing mechanisms.

Further objects of our invention reside in the production of a machine of this character which is efficient and economical in operation.

These and other objects, as will hereinafter appear, are obtained in the construction shown in the accompanying drawings. Such construction, while a preferred embodiment of our invention, is susceptible of various changes or modifications without departing from the spirit of our invention which is particularly defined in our annexed claims.

In the drawings, wherein like characters of reference indicate like parts throughout:

Figure 1 is a side view partly in elevation and partly in section, with parts broken away and a portion of the carrier or endless conveyer removed.

Fig. 2 is a fragmentary horizontal section through one of the flavoring or coloring containers taken on line 2—2 of Fig. 1.

Fig. 5 is a horizontal section through certain of the chambers taken on line 5—5 of Fig. 1.

Fig. 6 is a fragmentary perspective view illustrating more particularly the three companion members of the depositing mechanism in conjunction with a carrier or conveyer of slightly modified form.

Fig. 7 is a fragmentary elevation with parts broken away of a portion of the actuating mechanism.

Fig. 8 is a fragmentary elevation of such mechanism taken at right angles to Fig. 7.

Fig. 9 is a detail illustrating the cam and actuating slides of this mechanism, the followers of these slides being in section.

Fig. 10 is a horizontal section through the lower portion of the machine.

Fig. 11 is a fragmentary elevation in partial vertical section showing more particularly the reducing apparatus and feeding device associated therewith.

Fig. 12 is a vertical section of the reducing apparatus and feeding device, taken at right angles to Fig. 11, with a portion of the rotary grinding member broken away, and Fig. 13 is a fragmentary section of the pump casings taken on line 13—13 of Fig. 11.

Figure 3:
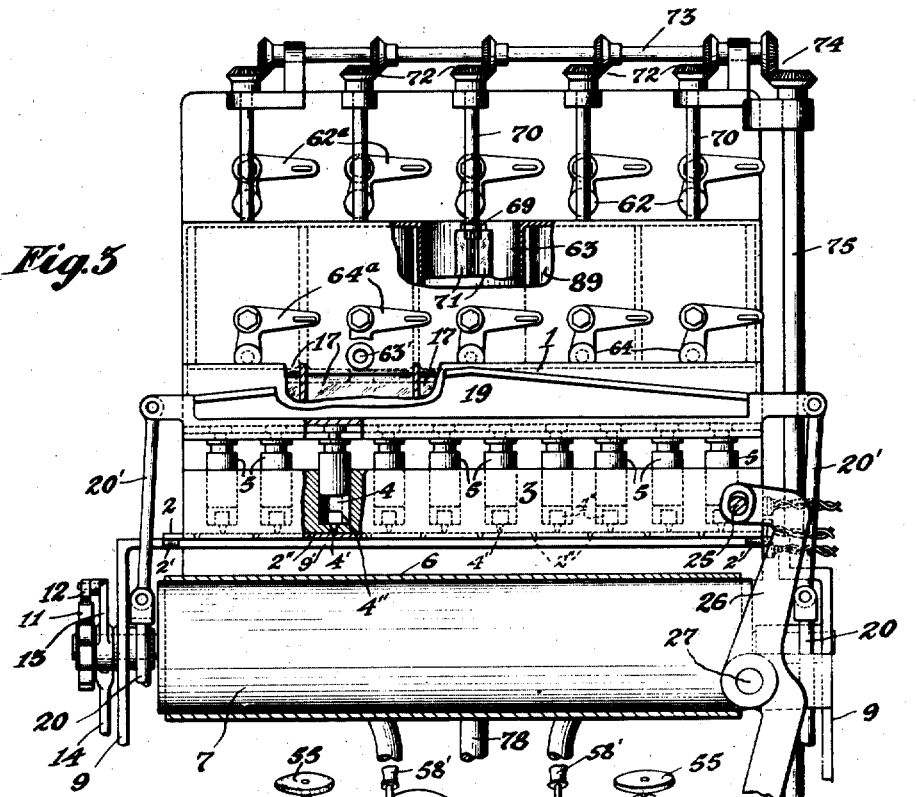
Fig. 3 is a front elevation of the upper portion of the machine with portions broken away, and the conveyer or carrier in section.
Figure 4:
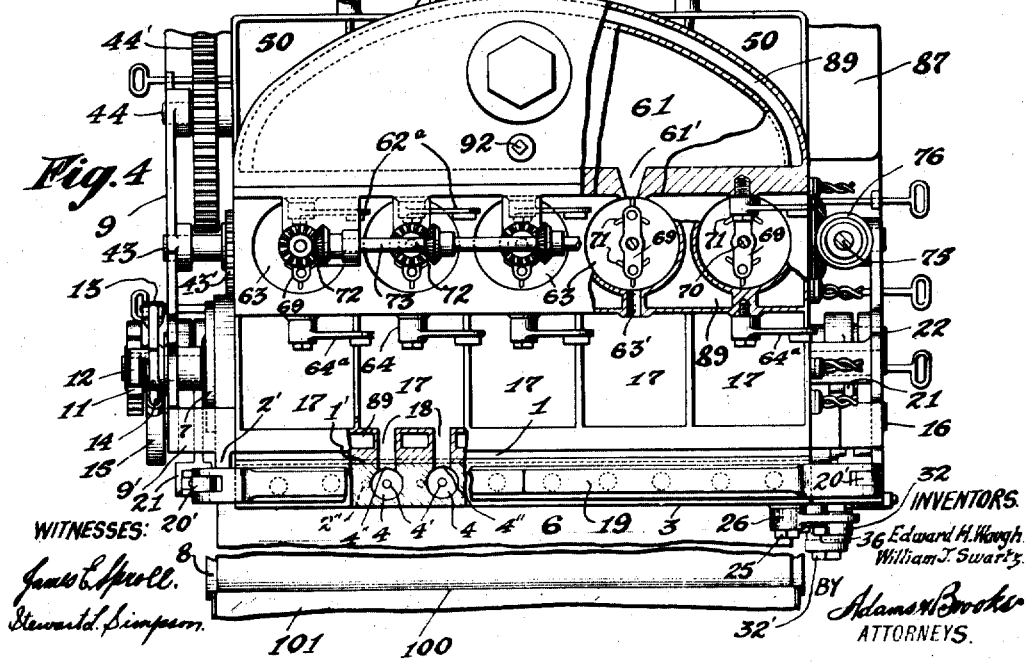
Fig. 4 is a fragmentary plan of the machine with portions broken away.

For the purpose of illustration we have shown our invention in conjunction with novel depositing mechanism, forming the subject matter of our application, Serial No. 743,118, filed January 20, 1913. This comprises companion parts, 1, 2, and 3, the latter of which is movable with respect to the first two named parts for controlling the intake and delivery of the confectionery mixture with respect to the depositing devices of the mechanism.

In our present construction we have disclosed a plurality of depositing devices comprising chambers 4 and plungers 5, from which the semi-liquid mixture is discharged intermittently onto an underlying carrier 6, which latter is of convenient length to insure of the deposits or products having ample time to cool and harden prior to their removal.

Carrier 6 comprises an endless belt taking over drive and idler rollers 7 and 8 respectively, the former of which is journaled in the main frame 9 of the machine and the latter in suitable stands 10.

Fixed to the axle of roller 7 is a ratchet wheel 11 with which a pawl 12 engages for imparting a step by step movement to carrier 6. Pawl 12 is pivoted on an angle lever 13, swingingly mounted on the axle of roller 7 and connected to a driving rod 14 which latter is provided with a suitable strap encircling an eccentric 15, fixed to a driven shaft 16, journaled on frame 9.

Companion part 3 which consists of a slide and is conveniently formed with the chambers 4, is formed in its lower, and inner vertical side faces with dove-tail grooves receiving respectively companion part 2 and a protuberance 1' of part 1, of corresponding cross sectional contour, for sliding movement thereon.

Companion part 2 is fixed to bracket extension 2' of a transverse frame member 9' and formed with ports 2'' adapted for registration with suitable delivery ports 4' of chambers 4.

Companion part 1 is shown as an integral part of a plurality of hoppers or containers 17 for the prepared mixture and leading from these hoppers or containers through part 1 are delivery ports 18 with which suitable ports 4'' of chambers 4 are adapted to register. In this connection it will be observed that ports 18 are arranged at one side of the related ports 2'' so that communication between the chambers 4 and their ports 18 will be established only when chamber ports 4' are closed against delivery by companion part 2. It will further be observed that the bottom walls of hoppers or containers 17 and the delivery ports 18 thereof are inclined, thereby enabling of the molten or semi-liquid material, if it be of the proper consistency, flowing by gravity to the chambers 4. This however, under usual conditions, can hardly be depended upon to insure of the proper and uniformly perfect feed of the material to the chambers. Therefore, we through the mechanism to be described, cause plungers 5 to move upwardly or on their suction stroke subsequently to the establishment of communication between ports 18, 4'' at which time part or slide 3 will be at rest. Another pause of part or slide 3 occurs when ports 4'', 2'' are in registration and at this time plungers 5 are moved downwardly or inwardly to eject the material which falling on carrier 6 will, unless suitable molds are provided on the carrier, assume the form of thin disk-like bodies. All of the chambers discharging simultaneously, the discharged predetermined quantities of material will lie on carrier 6 in a transversely extending row, as will be apparent. A step like movement of carrier 6 now occurs to advance the deposits from beneath part 2.

Plungers 5 are connected to a head 19, pivotally connected by rods, formed of articulated sections 20, 20', with arms 21 fixed to a rock shaft 22, journaled on frame 9. To permit of the normal set of plungers 5 being varied we adjustably connect rod sections 20 with arms 21, this being accomplished by externally screw threading the lower end portions of the rod sections and loosely engaging the same in blocks 23 which are pivoted in the arms 21 and engaged by nuts 24 mounted on the rod sections.

Part or slide 3 is pivotally connected at 25 with actuating mechanism consisting of a lever 26, fulcrumed at 27 and having its lower end portion pivotally connected to an actuating slide 28, conveniently guided, for horizontal movement, on fixed pins 29 of frame 9.

Reference numeral 30 indicates a second actuating slide arranged at right angles to slide 28 and below the same and guided for horizontal movement on guide pins 31 of frame 9.

Actuating slide 30 transmits motion to a bell crank lever 32, fulcrumed at 32' and connected by a link 33 with an arm 34 of rock shaft 22. The connection between bell crank lever 32 and slide 30 is such that the set of the bell crank can be varied in conformity with any adjustment desired to vary the stroke or length of stroke of plungers 5. This connection consists of a slide block 35 slidably engaged in a slot of the lever.

Reference numeral 37 indicates a screw rotatably mounted on actuating slide 30 and having screw threaded engagement with slide block 35. This screw is rotated, to advance pin 36 along the slot of the bell crank lever, through bevel gearing 38, one of which gears is fixed to a shaft suitably journaled on slide 30 and provided with a hand wheel 39.

Actuating slides 28 and 30 are provided with followers 28', 30' which engage in the groove of a drive cam 40, loosely mounted on shaft 16, and adapted to be connected therewith by a suitable clutch 42.

The groove of cam 40 has alternating throw and rest portions (see Figs. 9 and 10) all of substantially the same length, and followers 28', 30' being set to engage in said groove at substantially 90° apart, one follower will obviously be just leaving a throw portion on the cam as the other follower enters the same, thereby giving the pause to one actuating slide during the operating of the other. This mechanism effects the operation of part or slide 3 and head 19, the upper rod sections 20' connected with head 19 swinging on the lower rod sections 20, during reciprocatory movement of part or slide 3, as will be readily understood.

Shaft 16 is provided with a spur gear 41 which meshes with a pinion 43' on an intermediate shaft 43, journaled on frame 9.

Reference numeral 44 indicates a drive shaft connected by gear 44' and pinion 44'', as for example, with a suitable motor 45 and communicating its motion to intermediate shaft 43 through meshing gears 46, 46' on the respective shafts.

In accordance with our present invention we provide melting or cooking chambers 50, 50, 51, 51. Each of the chambers 50 communicates with a respective one of the chambers 51 through upper and lower ports, the former of which ports, which also serve as vents, are closed by valves 52, yieldingly held closed by springs 53, while the said lower ports are closed by manually opened valves 54, having their stems threaded in the walls of the adjacent chambers 50 and conveniently provided on their projecting end portions with hand wheels 55.

Extending around the upper portion of cooking chambers 51 are catch troughs 56 for water of condensation, and it is with these troughs that the upper ports or those controlled by valves 52 directly communicate, whereby upon the automatic opening of the valves through pressure of the steam generated, any collected water can escape with steam into chambers 50. By such construction, we can fill both the chambers 50 and 51 with material to be melted, as will hereinafter be more fully set forth, and utilize such of the steam and moisture as may escape from the chambers 51 upon opening of valves 52 in chambers 50, thereby obtaining an expeditious treatment of the material in an economical manner.

Chambers 51 are connected by passages 57, controlled by suitable valves 58 having operating handles 58', with apparatus for reducing the semi-liquid or syrupy mass to a creamy consistency, now to be described. This comprises a vertically disposed cylindrical chamber 59 having its inner face formed with spiral grooves 59' and snugly receiving a rotary grinding member or device 66 which is formed with spiral ribs 66' preferably of greater pitch than the grooves 59' and winding oppositely from the latter to act conjointly for reducing any solid particles in the mass as well as advance or elevate the latter. We have shown the ribs spaced farther apart than the grooves, such arrangement having been found efficient in practice.

Disposed between passage 57 and the base of the reducing apparatus is a pair of pumps 67 of the rotary type, each comprising a pair of oppositely rotating pistons or impellers 67' operated by a gear 78', on shaft 78, and arranged in a casing 67''. A port 58'', the upper surrounding edge of which forms a seat for valve 58, connects passage 57 with a casing 67'' on the remote side of the pistons from the grinding member 66. The mass will therefore be divided and impelled by the pistons to the central casing 68 which surrounds gear 78' and connects the pump casings 67''. Casing 68 is joined to chamber 59 by inwardly tapering side walls 68'.

A drain off valve or cock 105 is provided below each port 58'', the same being advanced to and from a closed position by hand wheel 106 and formed with a bore, registering with the corresponding port to slidably receive cleaning rod 107 which is operable independently of the valve by a pinion 108, engaging a rack 108' of the rod, to enter the port 58'' to clean the same.

Chamber 59 is surrounded by a water jacket 60 and communicates at its upper end portion with a main supply chamber 61, provided with a plurality of discharge ports 61', controlled by valves 62, and each communicating with a respective flavoring or coloring container 63 which containers in turn communicate through ports 63', controlled by valves 64, with the adjacent hoppers or containers 17.

Within containers 63 are stirrers these comprising upper and lower supports 69 fixed to vertical shafts 70 and having rotary bladed members 71 journaled in their outer end portions. These members 71 are each provided with three blades and being journaled in supports 69 will during rotating of shafts 70, be rotated about their own axes through counter action of the material and thereby tend to always direct the latter inwardly away from the side walls of the containers, in a manner insuring a more perfect mixing action.

Shafts 70 are connected through bevel gearings 72 with a cross shaft 73 journaled on bracket extensions of chamber 61, and driven through gearing 74 from a vertical shaft 75, which latter is provided on its lower end portion with a bevel gear 76 meshing with a loose gear 76' adapted to be connected to shaft 43 by a suitable clutch 77.

Reference numeral 78 indicates a shaft fixed to rotary device 66 and having its lower end stepped in a suitable bearing 79. This shaft is connected through gearing 80, an intermediate shaft 81 and gearing 82 with shaft 43, one gear of the gearing 82 being preferably loose on shaft 43 and adapted to be made fast thereto by a clutch 83.

For cooling the material while being acted upon by device 66 we provide a rotary pump 84, of any suitable type, which is connected with shaft 44. This pump is connected by pipes 85, 86 with a cold water tank 87 and water jacket 60 respectively.

Reference numeral 88 indicates a return pipe leading from water jacket 60 to tank 87.

Reference numeral 89 indicates a hot water jacket for containers 17, 63 and chambers 61, 51, the same having a filling aperture, closed by a plug 92, and being provided with suitable heaters, as 90 conveniently electric heaters of any well known type which have their resistance coils inclosed to prevent access of the water. Similar heaters, as 91 are also provided in cooking chamber 51.

In the operation of our invention, as when it is desired to produce a simple creamy candy, we open valves 54 and then insert through the ports controlled thereby a predetermined quantity of sugar to which is added water. Said valves 54 are then closed and chambers 50 filled or partly filled with sugar to which is added a smaller quantity of water than was placed in chambers 51. Heaters 91 are now rendered active to bring about the desired temperature in chambers 51, as for example 242° F. As these chambers 51 are vented through valves 52 opening automatically, as hereinbefore set forth, the escaping steam passes through the contents of chambers 50 thereby serving to heat and start the melting step, which will be completed in chambers 51, as will be understood in the following.

When the mixtures in chambers 51 have been melted, first one valve 58 is opened, then the other, to insure of a practically constant flow to chamber 59. As one chamber 51 empties, it is refilled by opening valve 54.

Valves 62 and 64 are conveniently pivotally supported and provided with handles 62$^a$, 64$^a$ respectively, whereby they can be opened to admit the mixture to the containers controlled thereby. Prior to the opening of valves 64, flavoring or coloring ingredients will have been worked uniformly into the mixture by the stirrers in containers 63.

Angle lever 13 is oscillated continuously and on its active stroke advances carrier 6, as hereinbefore set forth.

If desired we may provide a removing device 100, in the form of a scraper, which will remove the product from carrier 6 and direct the same into a suitable receiver 101, of any suitable construction.

In Fig. 6 we have shown the carrier in slightly modified construction. In this form the carrier or belt has its upper face formed with molding ridges or corrugations 6' extending in the direction of its length, these serving to form the bottoms or underfaces of the candies or products in a desired manner, whereby when the products are arranged in rows or in abutting relation to one another, channels or passages between the same, for the free circulation of air, will exist.

Having thus described our invention, what we claim as new, and desire to secure by Letters Patent of the United States of America, is:—

1. In apparatus of the character set forth, the combination with a pair of chambers, of means for heating one, means for conducting heated fluid from the heated chamber to the other chamber to initially heat the material therein, means for controlling said conducting means, and means for delivering the initially heated material from the second chamber into the heated chamber.

2. In apparatus of the character described, a pair of chambers, a port for establishing communication between said chambers, a heating means for one of said chambers, and a valve for said port automatically controlled for opening movement.

3. In apparatus of the character set forth, the combination with a pair of chambers, of means for heating one, means for conducting heated vapor from the upper portion of the heated chamber to the other chamber, to initially heat the material in the latter, automatic means for controlling said conducting means, and means for delivering the initially heated material from the lower portion of the second chamber into the heated chamber.

4. In apparatus of the character described, a pair of chambers, a catch trough for water of condensation in one of said chambers, a heating means for said last named chamber, and a port leading from said trough to the other of said chambers.

5. In apparatus of the character described, a pair of chambers, a catch trough for water of condensation in one of said chambers, a heating means for said last named chamber, a port leading from said trough to the other of said chambers, and a valve for said port.

6. In apparatus of the character described, a pair of chambers, a feed port between said chambers, a valve controlling the port, a vent for one of said chambers communicating with the other chamber, a pressure controlled valve for said vent, and heating means for said last named chamber.

7. In apparatus of the character described, a pair of chambers, a feed port between said chambers, a valve for said port, a vent for one of said chambers, heating means for said last named chamber, said vent communicating with the other of said chambers, and an automatically controlled valve for said vent.

8. In apparatus of the character set forth, an upwardly extending reducing device comprising relatively rotatable members having means for elevating the material between them, and means for supplying material to the lower portion of the device.

9. In apparatus of the character set forth, an upwardly extending reducing device comprising relatively rotatable members, said members having coacting grinding faces, one of which constitutes means for elevating material between them, means for supplying material to the lower portion of the device, and means for changing the temperature of the material during its passage through the reducing device.

10. In apparatus of the character set forth, an upwardly extending reducing device comprising relatively rotatable members having means for elevating the material between them, a supply chamber, and a pump for delivering the material from the chamber to the lower portion of the reducing device.

11. In apparatus of the character set forth, the combination with an upstanding reducing device, of means for preparing separate batches of material to be reduced, and pumps for separately and respectively delivering the prepared batches to the reducing device.

12. In apparatus of the character set forth, the combination with an upstanding reducing device comprising relatively rotatable members, one of which is provided with means for elevating the material between the members, of separate heating chambers, conduits extending from the chambers to the lower portion of the reducing device, pumps for delivering the material through said conduits to the reducing device, and valves controlling said conduits whereby batches in the chambers can be alternately fed to the reducing device.

13. In apparatus of the character set forth, the combination with means for working the material, of means for heating the material and delivering it to the working means, means for cooling said material while it is being worked, reheating means, said working means being also adapted for delivering the material to the reheating means.

14. In apparatus of the character set forth, the combination with means for working the material, of means for heating the material and delivering it to the working means, means for cooling said material while it is being worked, reheating means, said working means being adapted for delivering the material to the reheating means, and mechanism for forming individual articles from the material while reheated.

15. In apparatus of the character set forth, the combination with means for working the material, of means for heating the material and delivering it to the working means, means for cooling said material while it is being worked, reheating means, said working means being adapted for delivering the material to the reheating means, and mechanism for separating the reheated material into batches and stirring said batches.

16. In apparatus of the character set forth, the combination with means for working the material, of means for heating the material and delivering it to the working means, means for cooling said material while it is being worked, reheating means, said working means being adapted for delivering the material to the reheating means, means for stirring the reheated material, and mechanism for forming individual articles from the stirred and reheated material.

17. In apparatus of the character described, a cooking chamber, means for heating the cooking chamber, a second chamber connected with said cooking chamber, a valve controlling communication between said chambers, means for cooling said second chamber, means in said second chamber for treating the material, a receiving chamber for the treated material connected with said second chamber, and means for heating said receiving chamber.

18. In apparatus of the character set forth, the combination with means for working the material, of means for heating the material and delivering it to the working means, means for cooling said material while it is being worked, means for stirring the material, and common means for reheating the material prior to its stirring, and maintaining it heated while being stirred.

19. In apparatus of the character set forth, the combination with separate cooking chambers and means for heating the same, of a working device common to said chambers and disposed in an upstanding relation, means for delivering the material from the separate chambers to the lower portion of the working device, means for cooling the working device and the material therein, a reheating chamber connected with the upper end of the working device, a plurality of chambers communicating with the reheating chamber, stirring devices therein, a plurality of receiving chambers communicating with the stirring chambers, means associated with the receiving chambers for forming articles from the material, and common means for heating the reheating chamber, the working chambers and the receiving chambers.

20. In apparatus of the character described, a main supply chamber, a container having communication with said supply chamber, a valve for controlling communication between said container and chamber, a stirring device in said container, means for operating said device, a second container provided with an outlet port and with an inlet port the latter of which communicates with said first named container, valves for the ports of said last named container, and a water jacket for said chamber and containers.

In testimony whereof we affix our signatures in presence of two witnesses.

EDWARD H. WAUGH.
WILLIAM J. SWARTZ.

Witnesses:
HARRISON M. BROOKS,
JAMES E. SPROLL.